April 9, 1935.　　　　C. DOERING　　　　1,997,049
MOLDING DEVICE
Filed June 22, 1931
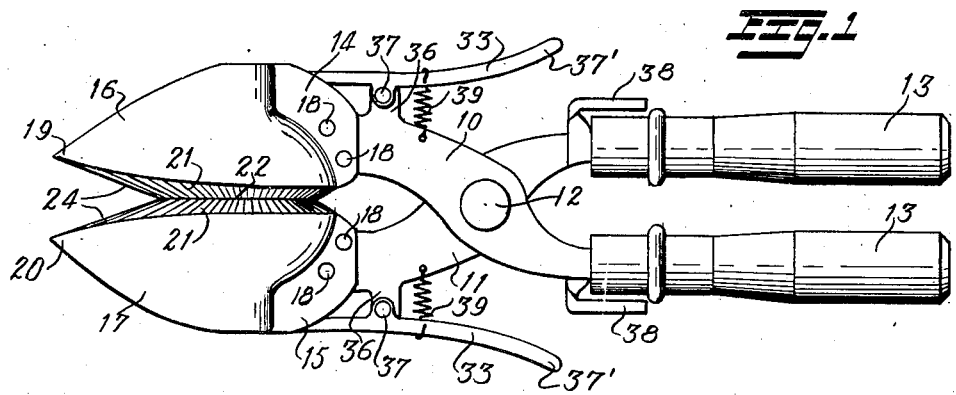
Fig.1
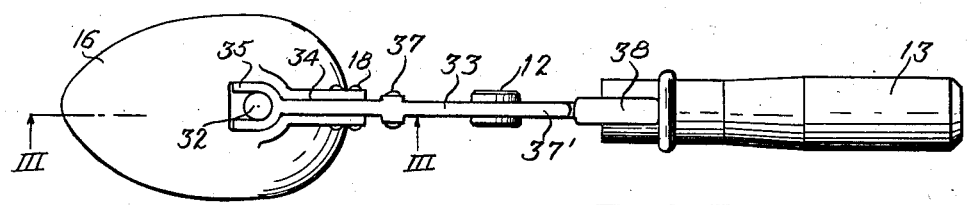
Fig.2
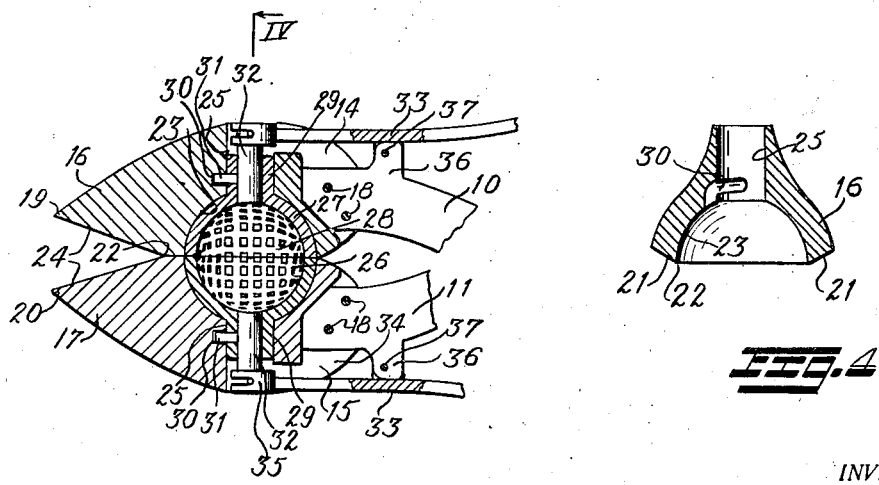
Fig.3
Fig.4
INVENTOR:
Charles Doering
BY
Harry C. Sebutz
ATTORNEY.

Patented Apr. 9, 1935

1,997,049

UNITED STATES PATENT OFFICE 1,997,049

MOLDING DEVICE

Charles Doering, Chicago, Ill.

Application June 22, 1931, Serial No. 546,128

5 Claims. (Cl. 31—43)

This invention relates to molding devices and more particularly to manual scoop for forming substances, although certain features thereof may be employed with advantage for other purposes.

It contemplates more especially the provision of novel means for forming edible substances into various shapes and palatable segments of pleasing appearance.

It has been customary to form edible plastics such as butter and kindred substances into rectangular bricks of confronting size; however, these necessitate transfers and longitudinal severance with auxiliary devices to create rectangular segments primarily for unit consumption. This contour is only utilitarian and does not enhance the appearance thereof which is an important factor in pleasing and enhancing the taste thereof.

The novel formation of edible plastics of varied design serves to impart a unique and far more pleasant appearance thereto. This is desirable in that it increases the consumption of such substances, and renders the use thereof a decided advantage at banquets and other gatherings where unique dress of the edibles is a primary feature.

One object of the present invention is to provide novel means for forming plastics into unique palatable units.

Another object is the formation of plastic units of varied design to impart a unique and pleasing appearance thereto.

Still another object is the provision of manually operated means for enabling the ready formation of edible substances into units of any selected design.

A further object is the formation of edible substances into units of varied design without entailing much labor or expense.

A still further object is the provision of novel means for forming edible plastics and effecting the placement thereof with utmost sanitation and minimum handling.

Other objects and advantages will appear from the following description of an illustrated embodiment of the present invention;

In the drawing:

Figure 1 is a front view in elevation of a device embodying features of the present invention.

Figure 2 is an edge view of the device shown in Figure 1.

Figure 3 is a sectional view taken substantially along line III—III of Figure 2.

Figure 4 is a sectional view of a die holder taken substantially along line IV—IV of Figure 3.

The structure selected for illustration comprises a pair of lever members 10 and 11 which are curved for intersecting relation about a pivot 12 serving as a connector therefor. The levers 10 and 11 terminate in any suitable handle members 13 to render the manual grasp thereof more convenient and effective in imparting pivoted movement thereto. As shown the levers 10 and 11 terminate in enlarged extremities 14 and 15 suitably shaped to serve as attaching brackets for confronting members 16 and 17, respectively. The members 16 and 17 are detachably or otherwise secured to brackets 14 and 15 by means of any suitable fasteners 18, and these may be cast or otherwise shaped from metal or other material as commercial practice may dictate.

The members 16 and 17 may be of any desired shape, and preferably are well rounded for termination in pointed extremities 19 and 20, respectively, for facilitating the passage thereof into mass substances with little resistance. In the present embodiment the extremities 19 and 20 emerge from the body of the members 16 and 17 to define spoon-like extensions having tapered confronting surfaces 21. The tapered surfaces 21 terminate in peripheral edge 22 on each of the members 16 and 17 to define the mouth of the confronting cavities 23 provided therein. Cavities 23 may be of any desired shape, and in this instance are semispherical for complemental association to define a sphere; however, this may be varied within a wide range to meet the requirements of commercial practice. The extremities 19 and 20 of the members 16 and 17, respectively, are spaced in suitable distance to present tapered opening 24 which terminates in the peripheral contacting edges 22 thereof, thereby directing the plastic material to the cavities 23 during the separated displacement thereof into a massed substance.

In order to enable the detachable association of any suitable molding dies with the cavities 23 diametrically disposed bores 24 are provided therein for extension entirely therethrough. The molding dies comprise, in this instance, sectional members 26 and 27 which are complemental to the cavities 23, and the interiors 28 thereof are formed in relief to impart any desired configuration to the substance confined therein. In this instance, the die interiors 28 are formed in relief to simulate a golf ball which will be molded or shaped from substances that are compressed therein by manipulation of handle members 13.

As shown, the die members 26 and 27 are semicircular for complemental association to define a sphere simulating a golf ball in every visual respect and these terminate in diametrically disposed bosses 29 shaped to correspond with the bores 25 for lodgment therein. So that the dies 26 and 27 may be detachably retained in association with the cavities 23, complemental connectors consisting of an irregular groove 30 in the bores 25 and a pin 31 extending from bosses 29 are provided to enable the ready association and disassociation thereof. With this arrangement the differently sized or shaped dies 26 and 27 may be readily substituted, and the device rendered more or less universal to produce edible substances of any desired configuration.

To render the molded substance or unit readily removable from the dies 26 and 27 responsive to their separation by the manual operation of the handle members 13, means are provided to eliminate any cohesion with the interior surface 28 of the die segments 26 and 27. The expelling means comprise, in this instance, rods 32 which are reciprocable within axial bores provided in the bosses 29 for communication with the interior 28 of the dies 26 and 27. The rods 32 extend through the bores 25, and levers 33 project through slots 34 provided in the cooperating members 16 and 17 for communication with the bores 25. Any suitable yoke connection 35 is provided between each of the rods 32 and each of the levers 33. Each yoke 35 is pivoted to a boss 36 formed on each of the levers 10 and 11, and the pivot pins 37 connect the bosses 36 with the levers 33 so that the pivotal movement thereof will impart reciprocal displacement to the rods 32. To this end, the levers 33 terminate in grooved arms 37' which are disposed in the path of the levers 10 and 11 for operation by trips 38 fixed thereto. The trips 38 are riveted or otherwise secured to the levers 10 and 11 below the pivot 12 thereof and adjacent to handles 13 so that their separation will cause the trips 38 to cam against the lever arms 37, thereby projecting the rejector rods 32 beyond the interior surface 28 of the dies 26 and 27. The retraction thereof is normally effected by means of springs 39 interposed between the lever arms 37 and the lever members 10 and 11, thereby creating an urge thereupon to normally maintain the rejector rods 32 in an inoperative position. It is to be noted that the extremities of the rejector rods 32 conform in configuration as a complement to the interior surface 28 of the die members 26 and 27 so that the impression thereof will be uninterrupted and free from mutilation.

It will be apparent from the above description that a novel device has been provided to form edible substances into any desired configuration for improving the appearance and novel attraction therefor. The device is readily manipulated with one hand and offers little resistance in penetration of plastic masses so as to serve in the nature of a scoop to hold palatable units and effect their placement on a plate or other surface without undue handling. Sanitation is an important factor in the formation and treatment of edible substances and this invention lends itself very effectively for the conversion of such substances into any desired segments.

Various changes may be made in the embodiment of the invention herein specifically described without departing from or sacrificing any of the advantages of the invention as defined in the appended claims.

I claim:

1. In a device of the character described, the combination with confronting members having cavities, of substance penetrating means on said members for guiding said members in a substance mass, means for effecting the approach of said members to each other for shaping the substance into a unit conforming to said complemental cavities, ejectors reciprocably mounted in each of said confronting members for communication with said cavities, levers pivoted to each of said confronting members in operative connection with said ejectors, and spring means for normally urging said ejectors to an inoperative position.

2. In a device of the character described, the combination with confronting members having cavities, of complemental molding dies detachably connected to said members and position in said cavities, substance penetrating means on said members for guiding said members in a substance mass, means for effecting the approach and separation of said members for shaping the substance into a unit conforming to said complemental cavities, and means extending through said molding dies for ejecting the shaped substance from each of said cavities responsive to the separation of said members.

3. In a device of the character described, the combination with confronting members having cavities, of complemental molding dies detachably connected to said cavities, substance penetrating means on said members for guiding said members in a substance mass, means for effecting the approach and separation of said members for shaping the substance into a unit conforming to said complemental cavities, means operatively connected to said molding dies for simultaneously ejecting the shaped substance from each of said cavities responsive to the separation of said members, and means for normally rendering said ejecting means inoperative.

4. In a device of the character described, the combination with spoon-shaped confronting members having complemental cavities therein, of complemental die sections detachably associated with said cavities, ejectors reciprocably mounted in each of said die sections, means for effecting the approach and separation of said confronting members to form units of predetermined configuration, and means for simultaneously operating said ejectors in said confronting members responsive to said last named means.

5. In a device of the character described, the combination with spoon-shaped confronting members having complemental cavities therein, of complemental die sections detachably associated with said cavities, means for effecting the approach and separation of said confronting members to form units of predetermined configuration, and means reciprocably mounted in each of said confronting members for simultaneously ejecting the substance from each of said cavities responsive to the separation of said members.

CHARLES DOERING.